United States Patent [19]
Delaire

[11] 3,841,615
[45] Oct. 15, 1974

[54] INSTALLATION FOR EXTRACTION OF DUST FROM FUMES EMITTED FROM A MIXER
[75] Inventor: Georges Delaire, Dunkerque, France
[73] Assignee: Creusot-Loire, Paris, France
[22] Filed: Oct. 18, 1972
[21] Appl. No.: 298,517

[30] Foreign Application Priority Data
Oct. 27, 1971 France .............................. 71.38534

[52] U.S. Cl. ........................... 266/15, 55/1, 55/385, 55/467, 98/115 R
[51] Int. Cl. ............................................ F27d 17/00
[58] Field of Search .. 55/385, 1, 467, 473, DIG. 29; 98/115 R; 266/15, 31, 37, 38, 39

[56] References Cited
UNITED STATES PATENTS
| | | | |
|---|---|---|---|
| 1,303,914 | 5/1919 | Kennedy | 266/15 |
| 2,942,540 | 6/1960 | Lundy | 98/115 |
| 3,204,393 | 9/1965 | Eklund | 55/407 |
| 3,747,909 | 7/1973 | Richards | 266/15 |
| 3,756,582 | 9/1973 | Overmyer et al. | 98/115 |

FOREIGN PATENTS OR APPLICATIONS
611,571 11/1948 Great Britain ....................... 98/115

Primary Examiner—Bernard Nozick
Attorney, Agent, or Firm—Cameron, Kerkam, Sutton, Stowell & Stowell

[57] ABSTRACT

Installation for extraction of dust from fumes emitted in pouring a melt from a mixer to a ladle movable with the melt pour stream, including two gathering hoods to be located above the ladle and each adapted to be connected by exhaust shafts to a dust-extraction unit, wherein the hoods are spaced for arrangement on opposite sides of the trajectories taken by the pour stream, the hoods having opposed suction mouths extending over a length at least equal to the range of the said streams, each hood being partitioned off into boxes forming two groups each of at least one box, one of which groups communicates with a suction shaft while the other is shut off by means of dampers, the one group corresponding with boxes facing the source of emission of the fumes.

6 Claims, 3 Drawing Figures

FIG:1

INSTALLATION FOR EXTRACTION OF DUST FROM FUMES EMITTED FROM A MIXER

The present invention refers to an installation for gathering and extracting the dust from fumes emitted at a mixer by cast-iron melts in ladles and from the fumes emitted during charging.

The struggle against atmospheric pollution due to the fumes from steelmaking processes takes on greater and greater importance at different stages of working of the products. In the mixer the liquid bath does not in general undergo any significant reaction liable to cause emission of fumes. On the other hand the sulphur in Thomas melts must be able to be eliminated before refinement in the converter. Desulphurization can in that case be effected in the ladle of melt during the pouring of the melt coming from the mixer. This desulphurization is in general due to an addition of sodium carbonate put into the ladle before pouring or thrown into the pour stream and is manifested by the appearance of fumes the dust content of which can appreciably exceed the maximum dust content which is generally accepted. Emissions of fumes with smaller dust content are likewise produced when charging the melt into the mixer, these fumes coming in that case from oxidizing reactions or from pulverization during the pouring of the bath of melt into the mixer, of the charges which float on top of the bath.

The installation in accordance with the invention provides more especially a solution to the problem of gathering fumes emitted during pouring of melt into ladles, by concentrating the intake of the fumes at the source of the emission, the position of which is given by the position of the melt ladle at any point in the path along which the said ladle follows the movements of the melt streams. Gathering of the fumes is therefore effected with the maximum efficiency for the minimum flow, this advantage being particularly important in the extent to which the dust extraction and suction installation can in that case be selected in accordance with relatively reduced capacity limits.

According to one aspect of the invention there is provided an installation for extraction of dust from fumes emitted at a mixer, comprising a device for gathering the fumes on pouring a melt from the mixer into a ladle movable along a path corresponding with the displacement of the pour stream, which device includes two gathering hoods to be located above the ladle and each adapted to be connected by exhaust shafts to a dust-extraction unit, wherein the hoods are spaced for arrangement on opposite sides of the trajectories taken by the pour stream, the hoods having opposed suction mouths extending over a length at least equal to the range of the said streams, each hood being partitioned off into boxes forming two groups each of at least one box, one of which groups communicates with a suction shaft while the other is shut off by means of dampers, the one group corresponding with boxes facing the source of emission of the fumes.

The invention will now be described in greater detail by reference to an embodiment given by way of example and shown in the drawings.

Figure 1:
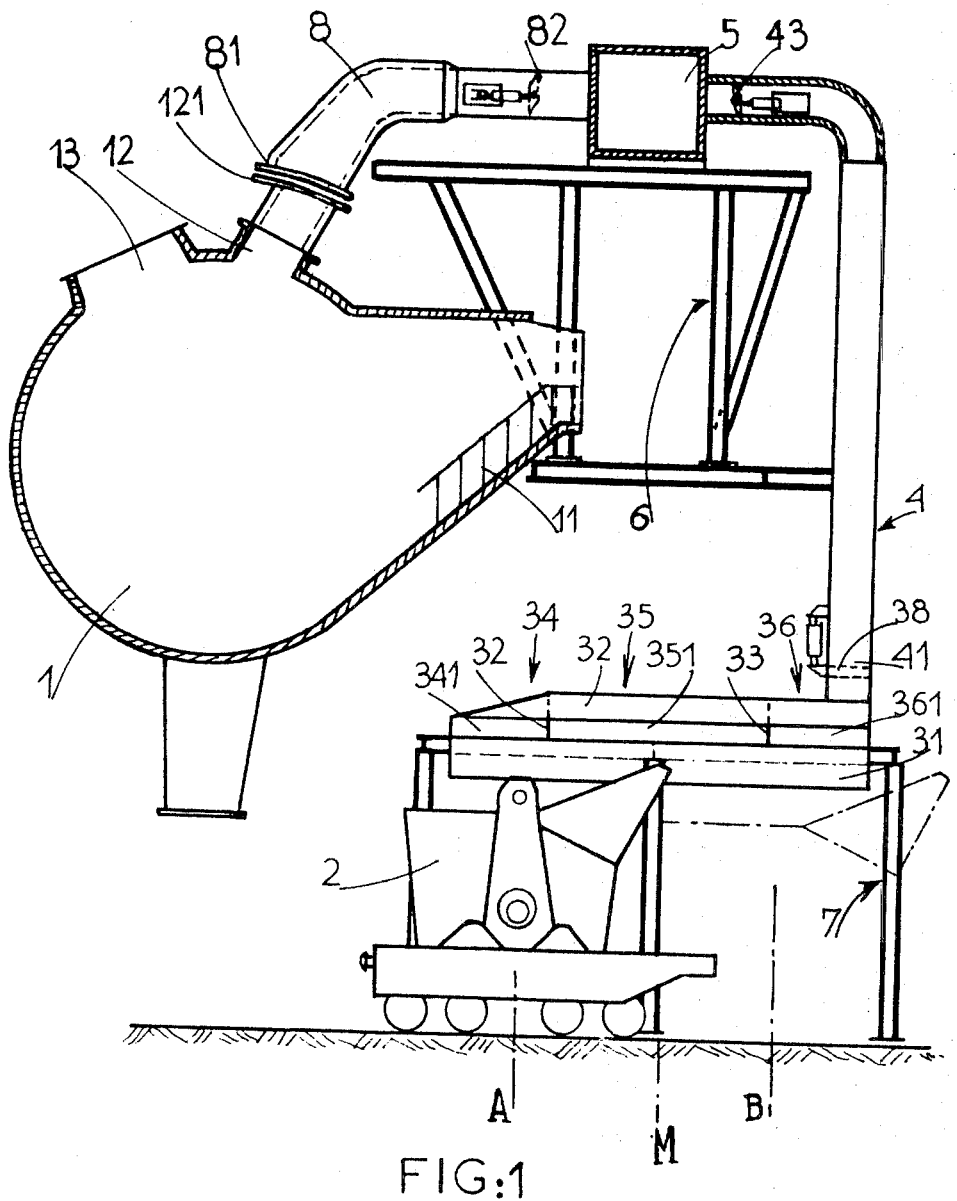
FIG. 1 shows at right angles to the axis of the mixer, the means of gathering the fumes above a ladle being filled with melt from the mixer and also the means of gathering the fumes on the mixer.
Figure 2:
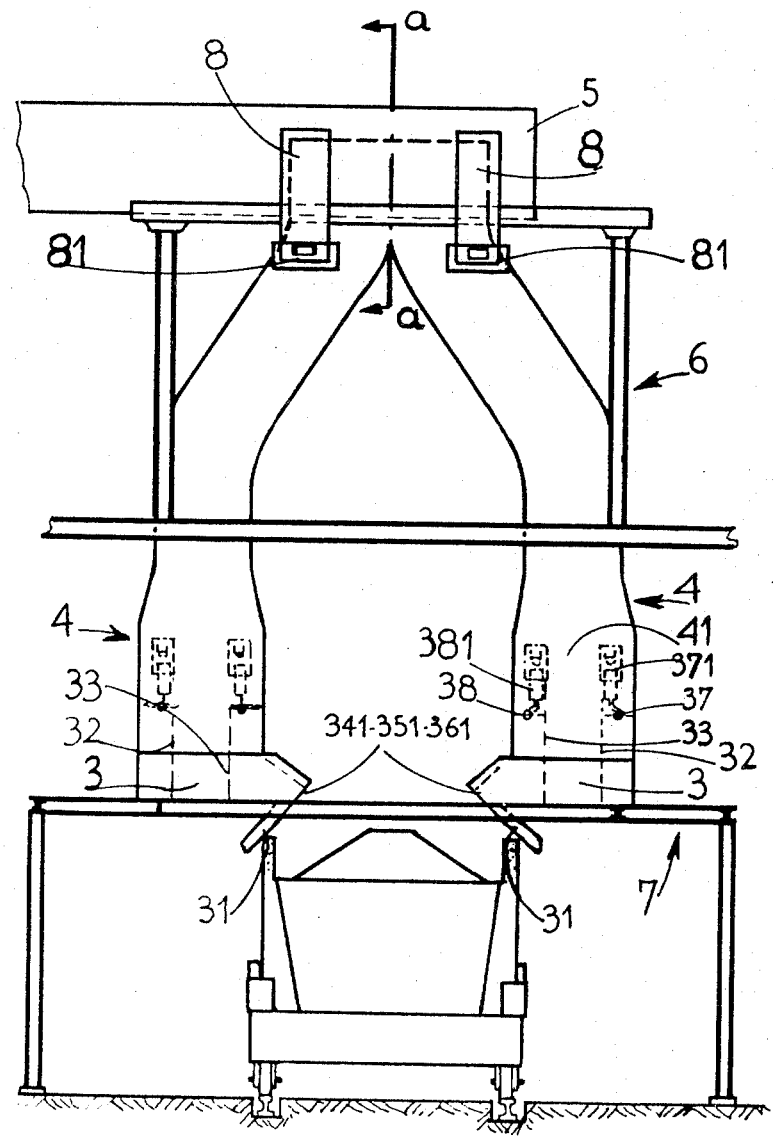
FIG. 2 shows this same device parallel with the axis of the mixer, the said mixer not being shown.

The installation shown in FIGS. 1 and 2 is intended for a mixer 1 with a horizontal axis, fed by melts of different origins. The mixer can swing round its horizontal axis so that the melt pours via the melt spout 11 into a melt ladle 2 in which desulphurization is performed and which is intended for feeding the converters. These melt ladles are movable on rails between two extreme positions A and B at right angles to the axis of the mixer in order to follow the displacement of the stream of melt according to the swing of the mixer and the level of the melt.

The gathering of the fumes emitted during filling of the melt ladles 2 is effected by means of two hoods 3 located above the melt ladle 2 and on opposite sides of the zone that the stream of melt sweeps across with the swinging of the mixer, the said hoods being of lengths at least equal to the path AB of the melt ladles 2. The fume suction circuit comprises two exhaust shafts 4 connecting the hoods 3 direct to a horizontal shaft 5 into which also opens a suction circuit for the charging fumes. The shaft 5 is connected to a dust-extraction apparatus (not shown), suction of the fumes through this apparatus being provided by fans venting into a chimney. The shafts 4 and 5 are supported by a metal framework of sections such as 6, the hoods 3 resting on a framework 7. The hoods are protected against the radiation from the melt and against splashing by panels 31 with refractory concrete cladding.

Each of the hoods 3 is partitioned off by vertical flaps 32 and 33. The independent boxes 34, 35, 36 thus formed, the three mouths 341, 351 and 361 of which are pointed towards the melt ladle 2, all three open out into the shaft 41. The flow of fumes drawn via the different boxes is adjustable by means of a system of dampers enabling the suction to be concentrated on the source of emission. The intake of the fumes by the mouth 341 is adjusted by a damper 37 operated by a jack 371. Similarly the suction through the mouth 361 is controlled by a damper 38 operated by a jack 381. The intention is that suction of the fumes at the time of emission is provided in the case of each hood by a group of two boxes, the centre box 35 being coupled either to the end box 34 or to the end box 36.

Suction is effected by the centre boxes 35 and the boxes 34 when the melt ladle is located between the midpoint M of the path AB and the end position B. Similarly the centre boxes 35 and the boxes 36 are in service when the melt ladle 2 is located between the midpoint M and the end position A. Thus when the melt ladle 2 crosses the midpoint of the whole path, two of the end boxes 36 are shut off (with the ladle going from B to A) by closure of the corresponding dampers while the other end boxes 34 come into service by opening of the corresponding dampers. The dampers 43 operated by jacks and mounted in the shafts 4 control the suction flow of fumes through the centre boxes coupled to the end boxes 34 or 36. The opening of these dampers is tripped at the required moment by the swinging of the mixer, the closure of these dampers shutting off the hoods 3 from the suction circuit.

Suction of the charging fumes is provided by shafts 8 lined inside with refractories, located opposite nozzles 12 integral with the mixer 1. The skirts 81 and 121 integral respectively with the shafts 8 and the nozzles 12 are of hemi-cylindrical shape so as to enable the mixer to swing, the dimensions of the shafts 8 being sufficient to ensure gathering of the fumes for different positions of fill of the mixer. The shafts 8 are coupled to the shaft 5, a damper 82 controlling the suction feed within the said shafts and thereby the depression inside the mixer 1. This depression causes the entry of air through the charging door 13, which carries with it the fumes produced in the mixer.

The operations of charging and pouring the melt are intermittent and cannot be carried out simultaneously. The dampers 82 and 43 are therefore not open simultaneously. The dust-extraction installation and the fans thus only have to satisfy one flow equal either to the flow necessary for the suction of the fumes through the hoods 3 during pouring into ladles or to the flow necessary for the suction of the charging fumes through the shafts 8, and not to both simultaneously. In the rest position of the mixer, that is, with neither charging nor pouring the damper 43 remains open so that the fan always draws on an open circuit. The flow drawn by the fan can in this case be economically reduced by means of paddles or director blading mounted upstream of the said fan.

Figure 3:
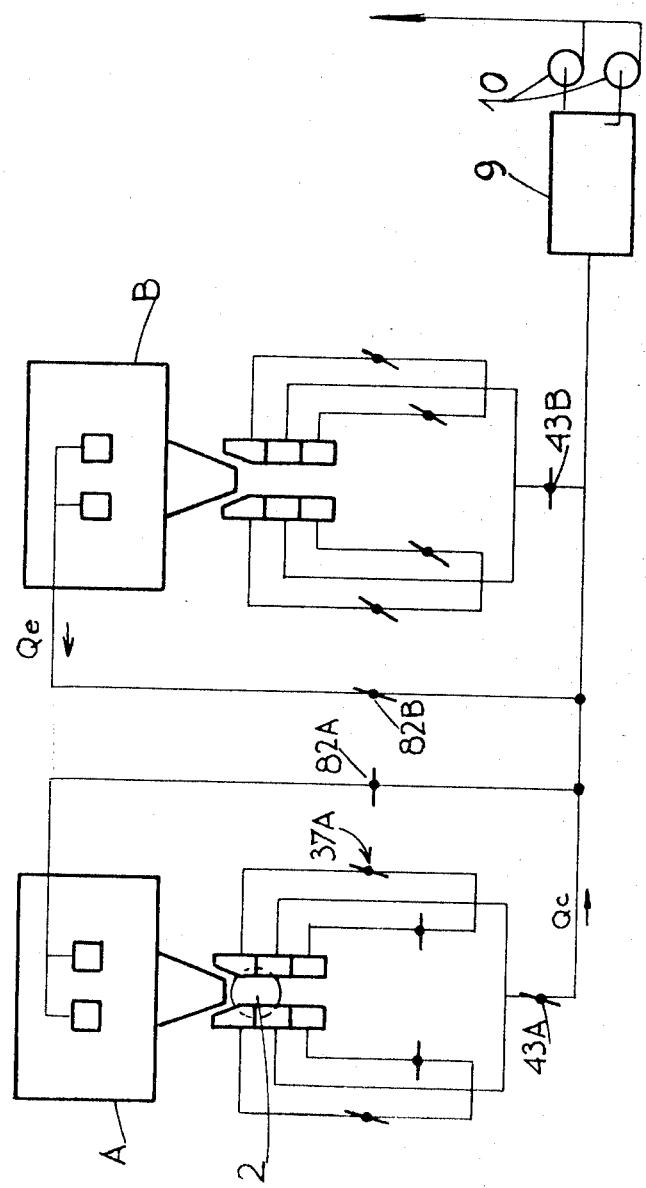
FIG. 3 shows diagrammatically a gathering and dust extraction installation in accordance with the invention adapted to two mixers operating alternately.

In order to make the best use of the dead time left between the charging and pouring operations, during which the dust-extraction and ventilation installations are not actually employed, it is of particular interest that to one and the same dust-extraction and ventilation installation a number of mixer fume gathering installations should be coupled. Such an installation arranged for two mixers is shown in FIG. 3.

In this installation the charging and pouring operations will be organized so that they are not performed simultaneously on both mixers. On the other hand a charging operation on one mixer can be effected simultaneously with a charging operation on the other mixer. FIG. 3 shows the latter eventuality. Charging is in progress on mixer B, the damper 82B being open and damper 43B closed. Mixer A on the other hand is in the pour position, the ladle 2 being in an advanced position. The damper 82A is in this case closed whilst the dampers 37A and 43A are open because of the position of the ladle. Thus if $Q_c$ is the flow necessary for the exhaust of the pour fumes and $Q_e$ the flow necessary for the exhaust of the charging fumes the total flow for which the dust-extraction installation 9 or the fans 10 must be designed cannot exceed $Q_e + Q_c$. If operation does not exclude the possibility of two simultaneous pours the suction capacity would be equal to $2Q_c$, a value higher than $Q_c + Q_e$ because the flow $Q_e$ is lower than the flow $Q_c$.

Of course the invention is not limited to the details of the embodiment which has just been described, and these details can be modified without thereby departing from the scope of the invention. Thus the centre boxes 35 which in the embodiment described are at the moment of suction of the fumes coupled with the end boxes 34 or 36, can be shut off when the ladle is towards the end boxes. The hoods can also comprise only two boxes each, the said boxes being placed alternatively in service according to the position of the melt ladle at the time of suction of the fumes.

I claim:

1. Process for extraction of dust from fumes from at least one mixer comprising the steps of collecting the pouring fumes from the jet of liquid metal poured from the mixer to the ladle by a first hood positioned adjacent the ladle connected to a fan and dust separator at a predetermined first suction and simultaneously isolating a second hood positioned at the mixer for collecting the charging fumes from the mixer with respect to the fan and dust separator during the operation of collecting the pouring fumes, collecting the charging fumes at a predetermined second and different suction and simultaneously isolating the first hood with respect to the fan and dust separator.

2. Process as described in claim 1, including the step of collecting at the first predetermined suction the pouring fumes from a first mixer, the second hood for collecting the charging fumes from said first mixer being isolated from the fan and dust separator and simultaneous collecting at the second predetermined suction the charging fumes from a second mixer, the first hood for collecting the pouring fumes from said second collector being isolated from the fan and dust separator.

3. Process as described in claim 2 including the step of collecting the fumes emitted during pouring by a compartmented hood, connecting the central compartments of the compartmented hood constantly to the fan and dust separator, connecting during the time when the ladle is closest to mixer the end compartments of the hood adjacent the mixer to the aspirator and dust separator while the compartments of the hood on the side of the central compartments away from the mixer are isolated from the fan and dust separator, and connecting the compartments away from the mixer to the fan and dust separator and isolating the compartments adjacent the mixer during the movement of the ladle.

4. Installation for the extraction of dust from the fumes from at least one mixer comprising a mixer, a ladle mounted for movement during pouring of liquid metal from the mixer, a first hood disposed above the ladle, an fan and dust separator, a first duct connecting said hood to said fan and dust separator, a second hood for collecting charging fumes connected to the mixer, a second duct connecting said second hood to said fan and dust separator, dampers in said first duct for controlling the suction at said first hood and dampers for control of the suction at said second hood in said second duct.

5. Apparatus as described in claim 4, said first hood including compartments disposed along the path of the jet of the liquid metal flowing from the mixer to the ladle having a length at least equal to the length of the path of the jet of liquid metal and dampers controlling the suction in each of said compartments.

6. Installation as described in claim 5, said first hood comprising two groups of three compartments, each group being disposed on one side of the path of the jet of liquid metal from the mixer to the ladle, said dampers for controlling the suction in said compartments controlling the suction in the end ones of said compartments, the central ones of said compartments being always connected to the fan and dust separator during suction of the pouring fumes.

* * * * *